United States Patent [19]

Seki et al.

[11] 4,005,386
[45] Jan. 25, 1977

[54] CLEARING SYSTEM

[75] Inventors: Mitsuaki Seki, Tokyo; Tamotu Nakazawa, Yokohama, both of Japan

[73] Assignee: Canon Kabushiki Kaisha, Tokyo, Japan

[22] Filed: May 19, 1975

[21] Appl. No.: 578,420

[30] Foreign Application Priority Data

May 21, 1974 Japan .............................. 49-56935
May 12, 1975 Japan .............................. 50-56999

[52] U.S. Cl. .................... 340/172.5; 340/173 R; 235/156
[51] Int. Cl.² .................... G08F 7/38; G06F 1/00
[58] Field of Search ............... 340/173 R, 172.5 R; 235/156

[56] References Cited

UNITED STATES PATENTS

3,762,637  10/1973  Hernandez ................. 235/156
3,855,461  12/1974  Stockwell .................. 235/156

Primary Examiner—Thomas B. Habecker
Attorney, Agent, or Firm—Fitzpatrick, Cella, Harper & Scinto

[57] ABSTRACT

A memory content is cleared by a clear signal which is formed from a combination of input information known by only a specified person. Said clear signal is developed by a combination of keyswitch inputs, or a combination of a keyswitch input and dial switch input, which dial switch is spatially separated from a clear unit.

8 Claims, 10 Drawing Figures

CLEARING SYSTEM

BACKGROUND OF THE INVENTION

1. Field of the Invention

This invention relates to a system for clearing a memory device in an inventory controlling machine, accounting machine, register or the like, and more particularly to a memory clearing system in which a clear signal is formed from a combination of input signals which are memorized by a specified person alone, and a third person cannot clear the memory content.

2. Description of the Prior Art

In the conventional memory clearing systems for data processing machines and the like, any person can clear the memory content, whenever so desired, by merely pushing once a specific clear key provided in the system. However, in data processing machines used for specific purposes, such as, for example, inventory controlling machines or bank account number indexers, if the memory content is once cleared either inadvertently or intentionally by a person unaccustomed to the machine operation, or by a third person, it is necessary to reregister a vast amount of data all over again, requiring a great deal of labor and time therefor.

SUMMARY OF THE INVENTION

In order to overcome such problem, the present invention is intended, as an object thereof, to provide a memory clearing system in which the clear instruction signal to the processing machine is encoded by a combination of certain input signals so that only a specified person who knows the code by heart can clear the memory content.

Another object of the present invention is to provide a memory clearing system of the type recited above in which the clear instruction signal is formed from a combination of input signals on a keyboard.

Still another object of the present invention is to provide a memory clearing system of the said type in which the clear instruction signal is formed from a combination of key input signals and dial input signals.

Yet another object of the present invention is to provide a memory clearing system which allows an operator to instruct the machine by using natural words.

A further object of the present invention is to provide a memory clearing system which permits the operator to properly change and set the clear instruction signal.

BRIEF DESCRIPTION OF THE DRAWINGS

FIGS. 4 to 8 are diagrams illustrating a third embodiment of the present invention which relate to a data comparison system, where

DESCRIPTION OF THE PREFERRED EMBODIMENTS

Now the invention is described in detail by way of some embodiments thereof while having reference to the accompanying drawings.

Figure 1:
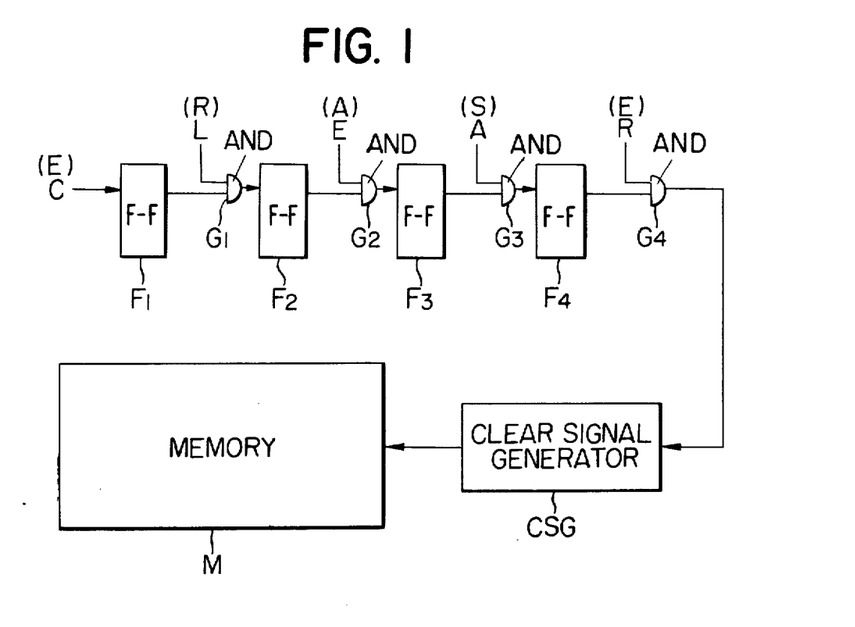
FIG. 1 is a block diagram of a first embodiment of the present invention.

Referring first to FIG. 1, there is diagrammatically shown a first embodiment of the present invention comprising flip-flops F1 – F4, AND gates G1 – G4, a clear signal generator CSG and a memory M, which are connected as shown in the Figure.

In this system, one can give the clear signal to the memory by pushing the alphabet keys C, L, E, A and R on a keyboard (not shown), in that order. That is, when the key top C is pushed, the flip-flop F1 is set, and when the key top L is pushed the AND gate G1 is opened to set the flip-flop F2. Then, when the key top E is pushed, AND gate G2 is opened to set flip-flop F3. Other key tops A and R are then pushed successively until the clear signal is ultimately issued from the AND gate G4 to energize the clear signal generator circuit CSG to clear the memory M. These keys can be arranged such that one can select a desired combination of keys, such as for example E R A S E, and push these keys in any desired order, but the order of pushing is to be memorized by a specified operator alone. Also, these keys may be combinations of operation keys ×, ÷, + and −, and result calculation instruction key =. It is also possible to select various combinations of Japanese KANA letter keys by a data processing machine. For instance, setting may be made such that the memory content can be cleared by pushing Japanese KANA letter keys キエロ (clear) in that order. It is also possible to increase the number of key tops, in which case the flip-flops and AND gates are also correspondingly increased. For instance, key arrangement may be made such that a certain memory is cleared by pushing the keys ゼンブキエロ (all clear) or チスウレジスタヲクリアシロ (clear entry register) or M E M O R Y N O 3 E R A S E. This makes it possible to input the address selection order by natural words when it is desired to select and clear a certain specific address, thus greatly facilitating the selecting and clearing operations.

Figures 2, 3:
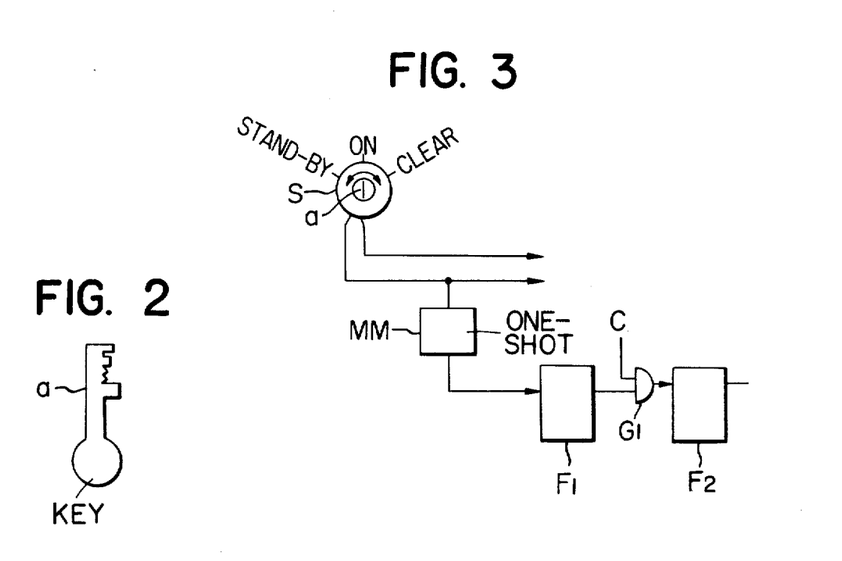
FIGS. 2 and 3 are diagrammatic drawings showing a second embodiment of the present invention.

Referring now to FIGS. 2 and 3, there is shown a second embodiment of the present invention where a part of the clearing unit is separated from the main unit body in order to make the clearing operation even more skillful and complicated, thereby further assuring memory secrecy.

In operation, key a shown in FIG. 2 is inserted into a receptacle S in the body portion of the apparatus shown in FIG. 3, and then when this key a is turned from the position of STAND-BY to ON, power is supplied to the machine to render it operative. When it is desired to clear a part or all of the memories in the machine in use, key a is turned from ON to CLEAR, whereby the one-shot multivibrator MM is actuated to set the flip-flop F1 shown in FIG. 1 and a clear signal is generated in the same way as described above by an encoded key input to clear certain memory contents. Thus, according to this embodiment of the present invention, separation of a part of the clear unit from the body portion of the apparatus permits a specified operator alone to perform the desired clearing operation, so that it is possible to prevent any inadvertent or intentional erasion of the memory contents. The part of the clear unit separated from the body portion may not necessarily be a key as mentioned above; it may be a code secreting medium, a specific instrument or any other suitable means separatable from the unit body.

In the first and second embodiments described above, it is impossible to change the cryptogram of the clear signal once the machine is sold and put to use.

Therefore, in the event that such cryptogram has been learned by a third person, it becomes difficult to maintain secrecy of the clear signal. It is therefore desirable for ensuring further security to make an arrangement in such a way that the cryptogram can be suitably changed and reset by a specified person in charge of management of the machine.

The third embodiment of the present invention is designed to meet such requirement. This embodiment relates to a data comparison system which has a kind of information retrieving function, so that the system manager can register a freely selected clear instruction cryptogram. Therefore, no other person than the manager himself can retrieve the registered cryptogram, and hence it is possible to perfectly secure secrecy.

As this embodiment is capable of performing short, full and classification retrievals, it is possible to effect various patterns of clearing operations such as short clear, full clear or classification clear by suitably selecting the address to be cleared in the memory. For adapting the clearing system of the present invention to this example, it is sufficient to provide the correspondence of the clear instruction cryptogram to the retrieved data, and of the clear instruction key input to the interrogation, respectively, and that the information signifying the clear operation be registered in addresses $X_1 - X_3$ appurtenant to the retrieved data.

The information retrieval apparatus will be briefly described hereinafter.

This embodiment concerns a data comparison system used in a data compiler, information retriever or like apparatus for investigating coincidence of the contents of two data, size relation thereof and other related matters, and more particularly to a data comparison system which is capable of selectively achieving full comparison (full-column comparison) or short comparison (partial comparison) of the data in accordance with an external instruction.

Generally, in information retrieving apparatus, the number of letters of the interrogation (retrieval) data has been determined by the specifications of the apparatus. In some information retrieving apparatus, a certain number of specific letters (or characters) are added as a redundant code after interrogation data entry so that the interrogation and the retrieved data in the apparatus are equal to each other in word length to perform the information retrieval. Such system, in substance, is also of the type in which the number of letters of interrogation and that of the retrieved data are treated and processed similarly.

In such apparatus, for instance in case that the interrogation is elongated or in case that an input operation of redundant code must be practiced many times, the operator is saddled with a great burden and his fatigue is increased. It was also not easy with said apparatus to perform the classifying and compiling process by merely retrieving the common matters alone.

The instant embodiment of the present invention has solved such problem and made it possible to reduce the input number of letters of interrogation while greatly facilitating the classifying works.

The information retrieving apparatus according to this embodiment of the present invention is provided with two types of instruction means for giving a short retrieval instruction: "compare the retrieved data and the interrogation from head of the retrieved data within the number of letters of its input interrogation" and a full retrieval instruction: "compare the contents if the number of letters of retrieved data is equal to that of interrogation", so that it permits retrieval at any number of letters to a halfway point with-out need of inputting all of the long interrogation, thus greatly lessening the burden on the interrogator (operator). In case that the corresponding data in the said short retrieval are present in the plural, if merely an alarm by a lamp or such is given without actually issuing any output, the operator can further continue input from the next letter to gradually increase the number of letters of interrogation until finally the desired retrieved data may be extracted. Further, in connection with the said short retrieval, if still another selection means (such as for example a classification instruction means) is provided, it is possible to obtain response to all of the corresponding data in the short retrieval by giving said both classification instruction and short retrieval instruction simultaneously. That is, it is possible to easily obtain classification information corresponding to the number of letters of interrogation. It is also easy to encode the clear structure and to freely change the cryptogram.

Figure 4:
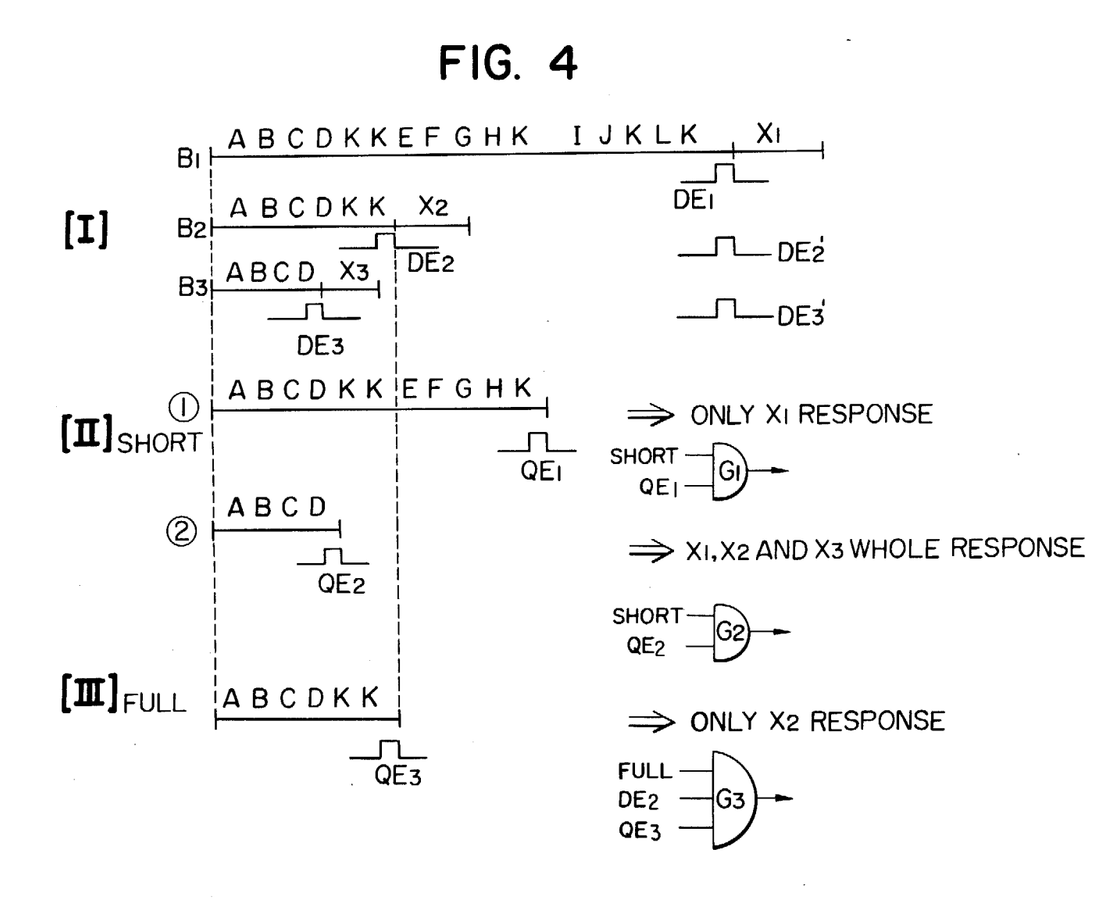
FIGS. 4, 5 and 6 illustrate the principles of the data comparison system.

FIG. 4 is a diagram illustrating the principle of the data comparison system of the information retrieving apparatus. Let it be assumed here that the records B1, B2 and B3 are memorized and stored as retrieved data in the information retrieving apparatus as shown in the drawing, and that the contents of the response to be given to the operator in correspondence to said retrieved data B1, B2 and B3 are also memorized and stored as X1, X2 and X3, respectively, immediately after said respective data. It is also assumed that these data contents have been entered respectively as: B1 = A B C D K K E F G H K I J K L K, B2 = A B C D K K, and B3 = A B C D, and the interrogation entered as: A B C D K K E F G H K, as shown in the figure. Then, when a short retrieval instruction is given, the record of data B1 corresponds thereto and hence X1 alone is given as a retrieval response. This means that the operator need not input down to the succeeding interrogation I J K L K. For accomplishing such a pattern of retrieval, there is provided an AND gate G1 to which the short instruction and signal QE1 indicating the final data position of interrogation are applied and which is arranged such that the output of the comparator circuit is controlled by the output of said gate G1. If the short retrieval instruction is given by entering only the interrogation A B C D, AND gate G2 gives its output at the time of comparison of all of the data B1, B2 and B3 to actuate all of the comparator circuits, so that the whole of the X1, X2 and X3 responses are given out. Also, if short retrieval is performed by entering further to A B C D K K, responses X1 and X2 are given by similar operation. This is suited for classification works as aforementioned. In case the full retrieval instruction is given by entering the interrogation up to A B C D K K, there is used an AND gate G3 to which the interrogation data end signal QE3, retrieved data end signal (DE1, DE2, and DE3 corresponding to data B1, B2 and B3, respectively) and full retrieval instruction signal are applied, and the output of said gate G3 is produced only when the number of letters of the interrogation is equal to that of the retrieved data (that is, when data B2 is involved), and data B2 is selected to give X2 alone as a response.

Thus, the information retrieving apparatus according to this embodiment of the present invention is arranged such that the contents of the data are not only compared with each other by a comparator circuit but also the output of the comparator circuit is controlled in accordance with the detected data length. More specifically, in the case of short retrieval, the output of said comparator circuit is controlled by the final letter output QE in interrogation, and in the case of full retrieval, the output of said comparator circuit is controlled by the output developed when the number of letters of retrieved data and that of interrogation are equal to each other (that is, when QE and DE are equal to each other). Although the foregoing description is concerned with a case where the data involved are of variable length, such data may be of fixed length, in which case the signals DE1, DE2 and DE3 in (I) of FIG. 4 are used.

Figure 5:
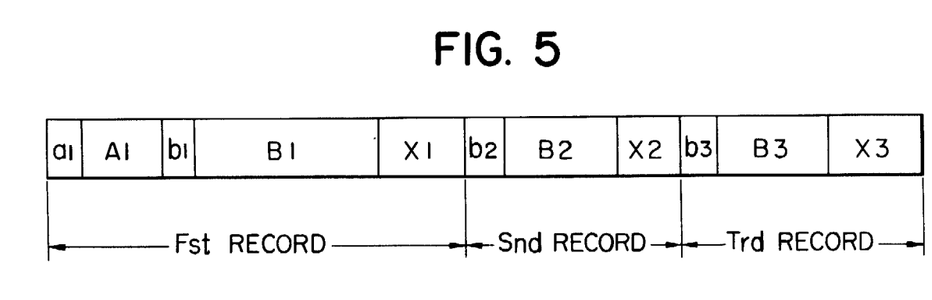

FIG. 5 is a file compiling diagram according to the variable length records of retrieved data in the apparatus of the present invention. In the diagram, A1, B1, B2 and B3 represent the respective items of retrieved data D and it is here assumed that the following data contents: A1 = L M N, B1 = A B C D K K E F G H K I J K L K, B2 = A B C D K K, and B3 = A B C D, are stored, with A1 and B1 being stored in the first record, wherein, for instance, A1 signifies telephone operator, B1, the telephone room and response X1, the telephone number all belonging to the same category. B2 – B3 are of the different categories and are memorized in different records. X1, X2 and X3 signify items for response corresponding to the respective data of A1, B1, B2 and B3, where suitable response data such as a telephone number, address, etc., are stored therein. $a1$, $b1$, $b2$ and $b3$ signify the sections indicating the number of letters of the respective items, where the number of letters less 1 is memorized.

Figure 6:
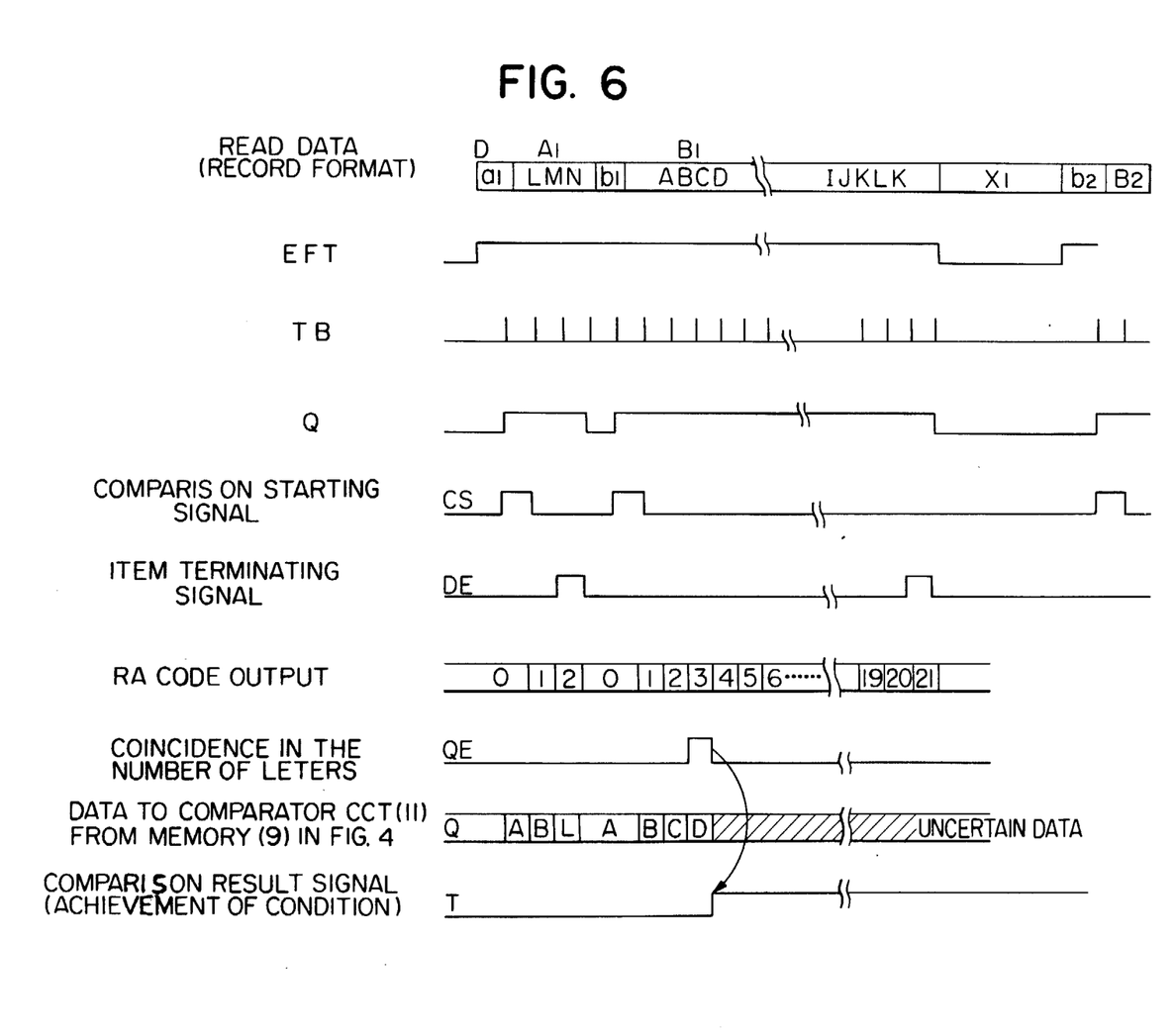
Figures 7, 7B:
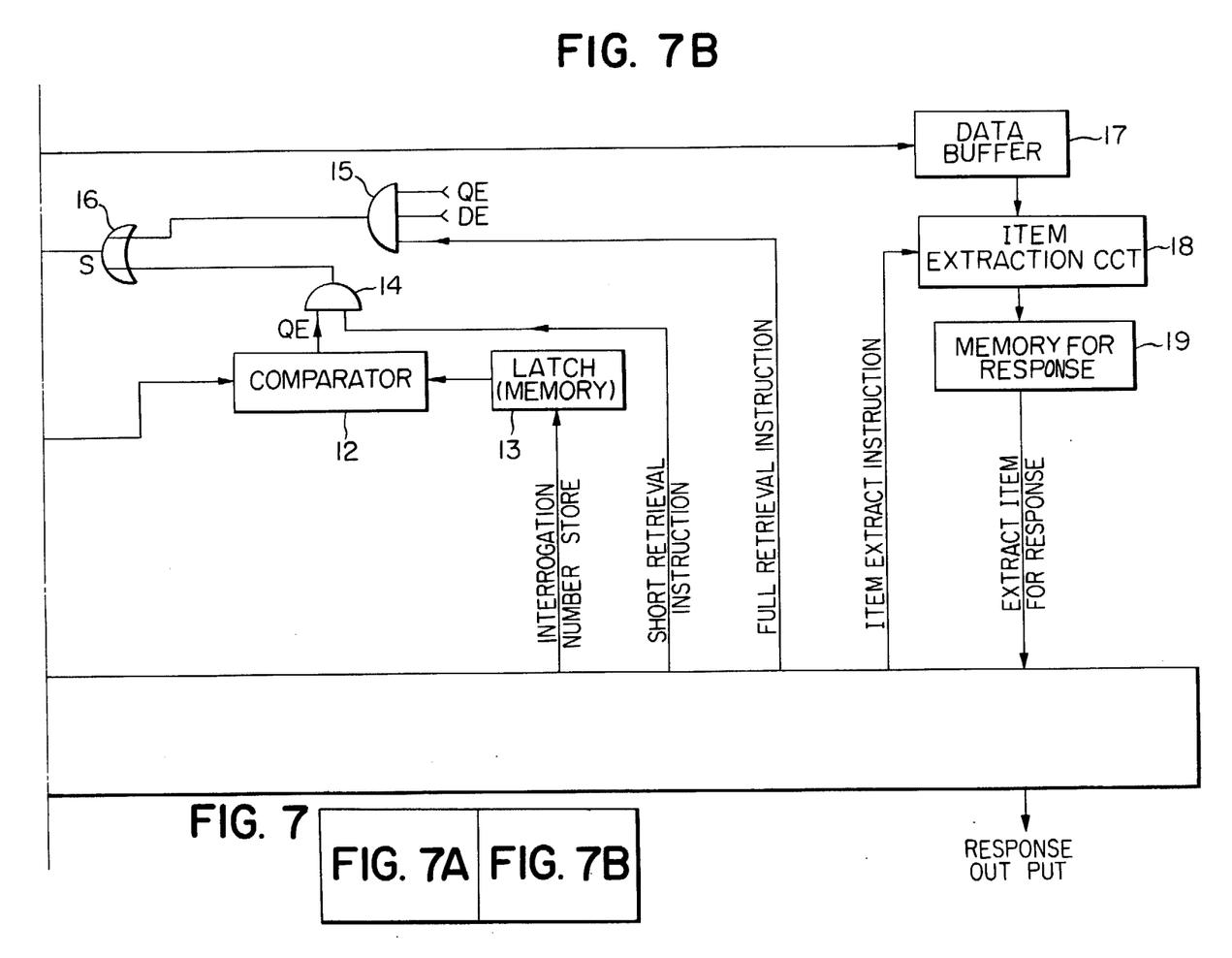
FIG. 7 is a block diagram thereof.
Figure 7A:
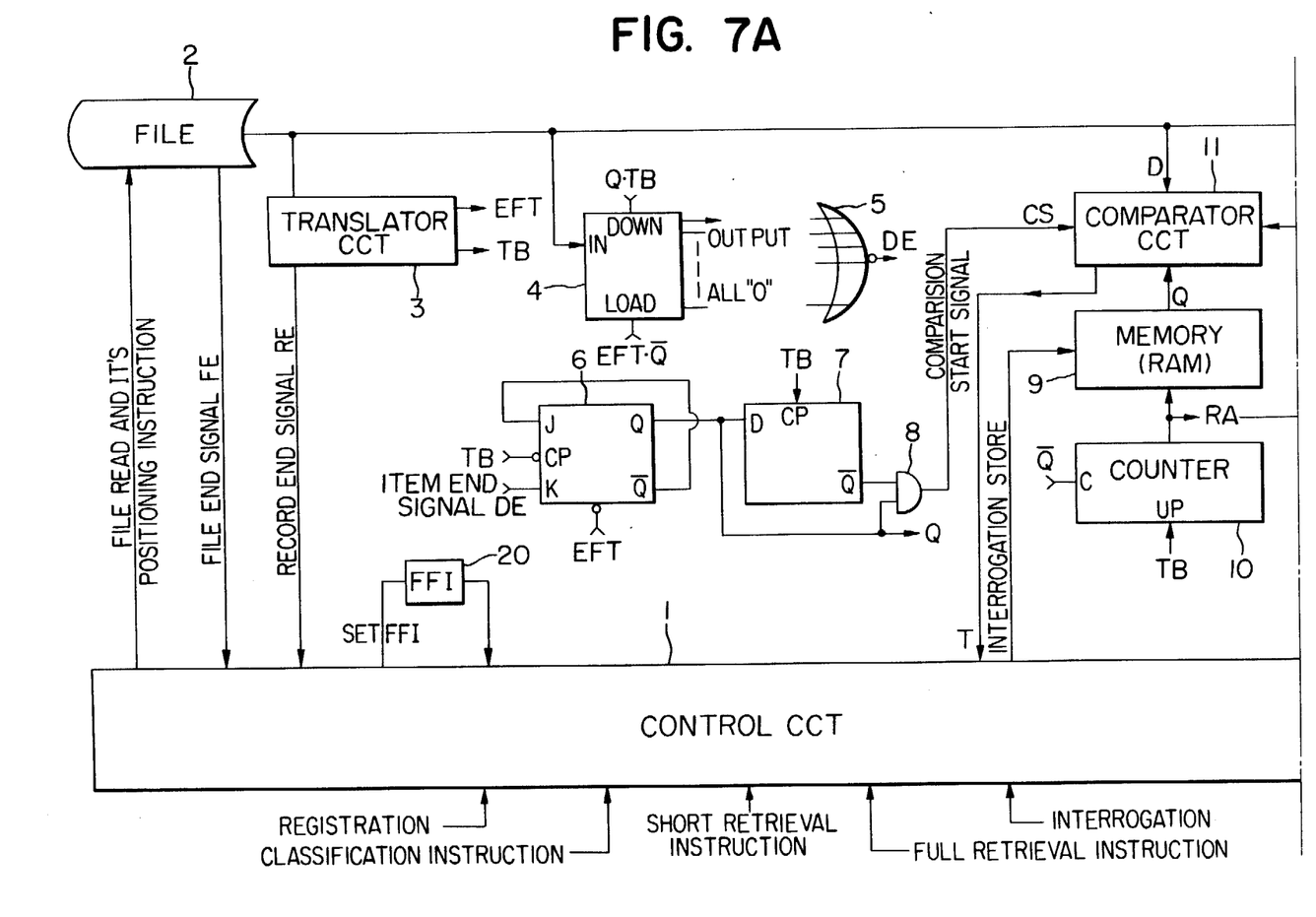

FIG. 6 shows a part of the time chart in case that the first record in FIG. 5 is controlled by the circuit of FIG. 7. In this case, 3 letters are memorized in A1 item and 22 in B1 item, and 2 is memorized in $a1$ and 21 in $b1$.

Figure 8:
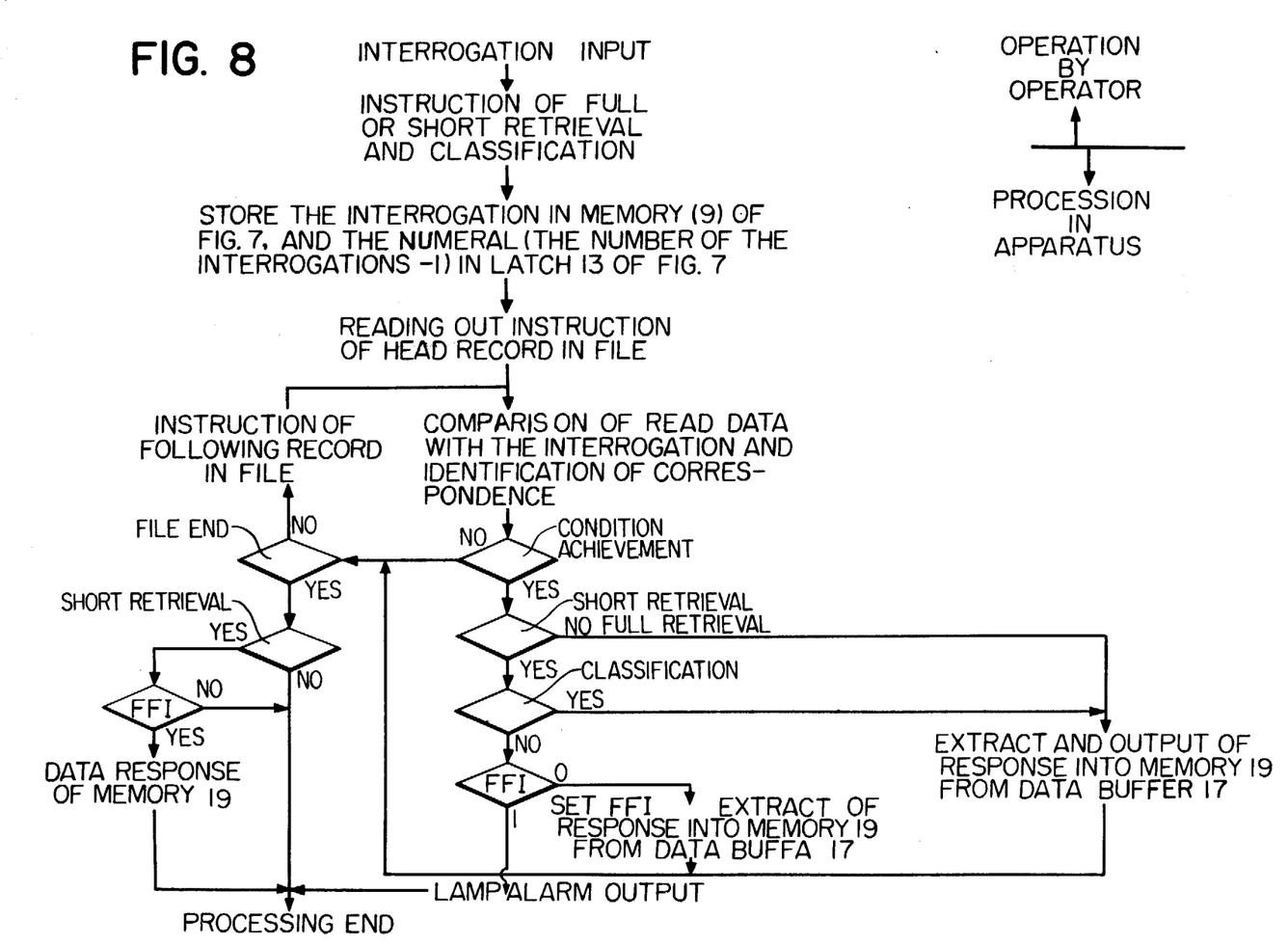
FIG. 8 is a flow chart illustrating the operation thereof.

FIG. 7 is a detailed circuit arrangement for carrying out said retrieval, and FIG. 8 is a flow chart illustrating the operation therefor.

In FIG. 7, reference numeral 1 indicates a block diagram of a control circuit in which various control instructions such as full retrieval, short retrieval and classification, and registration and interrogation are entered from without and corresponding instructions are supplied to each of the hereinafter described component parts 2 – 20, and the response is produced on an output line. Numeral 2 designates a memory device (hereinafter referred to as a file) in which the records to be retrieved are stored, and 3 designates a translator circuit for developing a required timing signal from read data D. TB represents a basic timing pulse, RE a record end signal, or a signal indicating the end of one record, and EFT a signal given during the period of retrieved data in each record of read data. Numeral 4 designates a counter for determining the end of each item. It receives the length information ($a1$ $b1$, etc.) of respective items from read data and counts down at a certain period (TB). When the counter content has reached a certain given value, it is used to produce an item end signal DE (or ALL "0" in this circuit). Numeral 5 is an NOR gate for generating the item end signal in cooperation with said counter 4. It issues the item end signal DE when the content of the counter 4 has become all "0". Numeral 6 designates a flip-flop which is set by the first TB pulse of each item and reset by the item end signal DE. It remains cleared when no record is being read out. Numeral 7 designates a D-type flip-flop which receives a signal from the flip-flop 6 to generate a signal delayed the duration of 1 TB pulse time. The output signals from said two flip-flops 6 and 7 are fed to an AND gate 8 which, in turn, gives out a comparison start signal CS. Numeral 9 designates a memory (such as RAM) in which the interrogations Q are stored and which, in combination with the below-mentioned address counter 10, can produce an output from its head at any desired time. Numeral 10 designates an address counter for said memory 9. It is also used as a counter for counting the number of letters of each item of read data. Numeral 11 designates a comparator circuit for comparing read data D and interrogation Q. It starts comparison processing upon receiving the comparison start signal CS and suspends its operation upon receiving a result judgment instruction S from an OR gate 16 and produces coincidence signal T. When the start signal is fed before the result judgment instruction S, the process performed so far is dissolved and the entire process is carried out all over again. Numeral 12 designates a comparator circuit for detecting coincidence of the number of letters of interrogation with that in each item of read data. That is, it detects coincidence of the output of said counter 10 with that of a latch (memory) 13 in which the number of letters of the interrogation less 1 is entered. The content of this latch is used as the output of said comparator circuit 12. Numeral 14 designates an AND gate for the short retrieval instruction and the number of letters coincidence signal QE which is the output of said comparator circuit 12. In the case of short retrieval, it produces the result judgment instruction S of the OR gate 16. Numeral 15 designates also an AND gate which generates the result judgment instruction S of the OR gate 16 for full retrieval and which receives number of letters coincidence signal QE, item end signal DE and the full retrieval instruction. Numeral 16 designates an OR gate which sends a result judgment instruction S to the comparator circuit 11 in case of either full retrieval or short retrieval. Numeral 17 designates a data buffer for storing read data in one record. This buffer must be longer than the maximum record length. It relays the memory contents to an item extraction circuit 18. This circuit is capable of extracting any desired item from one record. It is actuated upon receiving an item extraction instruction from the control circuit 1, and sends the instructed item to a memory 19 which stores one item extracted from the circuit 18. Numeral 20 designates a flip-flop used for judging whether the response is plural or not when processing has been done without making classification, in the case of short retrieval. It is set upon receiving a set instruction from the control circuit 1. This flip-flop is set when there is only one item for response, and if there exists any other item for response in the succeeding process, a lamp is lighted to give an alarm.

Now the operation of the circuit of FIG. 7 is described with reference to the flow chart of FIG. 8. Supposing that the data to be retrieved are already all registered, the operator (interrogator) first enters an interrogation to make an instruction for full retrieval, short retrieval or classification. That is, one of the following three kinds of instructions is given: Full retrieval instruction — Find out the record(s) storing the retrieved data having the same number of interrogation letters and also having the same contents, and supply the response items of all of the corresponding records; Short retrieval instruction (classification if OFF) — If the records storing the retrieved data having the same contents from head to the interrogation letter number at a single given location, supply the response items of the records; and Short retrieval instruction (classification instruction is ON at the same time) — Compare the retrieved data from head to interrogation letter number in the same way as said above, and supply the response items of all of the records with the same contents.

When the control circuit 1 of FIG. 7 receives said instruction of the operator, first the interrogation is stored in the interrogation storage memory 9 from the leading address while the number of letters of the interrogation less 1 is stored in the latch 13, and a full or short retrieval instruction is given. Then an instruction for reading out the head record is given to the file 2. The retrieved items in the read-out records are all compared and checked, so that after the record end signal from the translator circuit 3 has been received, the comparison result signal from the comparator circuit 11 lets it known whether there is any item among those in the just read records which meets the given conditions. If there is no such item, the next record readout signal is given to the file 2, and this is continued until the file end signal is received from the file 2. When achievement of the desired condition in a certain record is made known by a coincidence signal T, and if the instruction given from the operator is full retrieval or classification, the particular record outputs its response items successively until termination of the file. If the instruction is short retrieval, flip-flop FF1 is set for the first correspondence to memorize the fact tht there was one correspondence. At the same time, a response item extraction instruction is given to the item extraction circuit 18 for the record which is stored in the data buffer 17 and which has just been subjected to the comparison process, so as to extract the response items in the memory for response 19. This is immediately followed by the next record processing to determine whether or not there exists any other corresponding record. If any corresponding record presents itself again, the lamp alarm output is given by setting the flip-flop FF1 at 1 to complete the process. But if the process has been carried on until termination of the file, and the corresponding record remains single in number at the very end, the item extracted in the response memory 19 is now given out.

Now the pattern of record compilation shown in FIG. 5 is described in accordance with the time chart of FIG. 6.

In FIG. 6, the A1 item stores data of three letters L M N while the B1 item stores data of 22 letters A B C D K K W X Y Z K E F G H K I J K L K, and data for the response are stored in the X1 item.

Let's take the example of the short retrieval instruction by assuming that the interrogation is "A B C D". Letters A B C D are stored from the head address in the memory 9 in FIG. 7, so the these letters are read out successively in synchronization with the basic unit time pulse TB of the received letters. The output RA of the counter 10 acts as the address, and the data is sent to the comparator circuit 11. On the other hand, the record translator circuit 3 produces a signal EFT only during the period when the read data is retrieved data. It also generates a time pulse TB which corresponds to the one-letter time of the read data. Consequently, the flip-flop 6 is set by the first time pulse TB after the signal EFT has become 1 and generates a signal Q.

Also, a pulse the comparison start signal CS is produced by the D-type flip-flop 7 and AND gate 8. In the counter 4, pulse TB is fed, during the time when Q = 1, to the down terminal which takes in the information given to the IN terminal at the time EFT.$\bar{Q}$, so that the counter content is subtracted upon every one-letter advancement of the read data, and the item end signal DE is generated from the NOR gate 5.

In the comparator circuit 11, the condition that has existed to that moment is reset always by the leading edge of the comparison start signal CS, and comparison of the read data and the data from the memory 9 is performed until the result judgment instruction is given. After the coincidence signal T is once made "1" by the result judgment instruction, the start signal is to be ignored. However, since the counter 10 is always recleared at $\bar{Q}$, the output letter number coincidence signal QE of the comparator 12, which detects coincidence of the latch information (interrogation number - 1 = 3) and the output RA of the counter, is not given out during processing of the A1 item of FIG. 6 but is issued only during the one letter period from the moment when RA corresponding to the fourth letter of the B1 item has become 3, until it becomes 4. Consequently, since the short retrieval instruction is 1, AND gate 14 produces the same output as the coincidence signal QE and such output is given as the result judgment instruction through OR gate 16. In the foregoing examples, no output is derived from AND gate 15 because the full retrieval instruction is 0, and also because the letter number coincidence signal QE and item end signal DE don't overlap each other during the same time. That is, this signal is issued only when the full retrieval instruction is 1 and the letter number coincidence signal QE and the item end signal DE appear at the same time. Thus, in the case of a full retrieval instruction for 22 letters of interrogation "A B C D K K W X Y Z K E F G H K I J K L K", said data are stored in the memory 9 of FIG 7 while the value (22 − 1 = 21) is stored in the latch 13. Thus, if the comparison process is started when the full retrieval instruction has also become 1, the letter number coincidence signal QE of FIGS. 6 and 7 is issued when the content of counter 10 has become 21, that is, concurrently with issuance of the item end signal DE, whereby both AND gate 15 and OR gate 16 of FIG. 7 are actuated to produce the result judgment instruction to extract the above-said result. The coincidence signal QE of AND gate 15 is not necessary if the retrieved data are of a fixed length record.

In the above-said operation, the read data (records compiled to a certain agreement) are passed only once, and the comparison process of all the items can be accomplished no matter how many items to be retrieved are involved therein. For instance, if said agreement is such that the response X1 is given out upon entering either of the interrogations A1 or B1 in a single record, it is possible to obtain X1 from either of the interrogations A1 and B1. This is also obviously possible with both short and full retrievals. If the interrogation is for instance "L M N", response X1 can be obtained in either full or short retrieval. X1 can be also given out in short retrieval with the interrogation of "L" alone.

There is thus provided according to this embodiment of the present invention an excellent data comparison system with extremely high utility. It is suited for adaptation in an information retrieving apparatus using natural words, but can be also applied as effectively to data processing apparatus for general purposes such as compilation, classification, etc.

For adapting the clear system of the present invention to the mechanism such as described above, the following procedure is taken:

1. A clear instructing cryptogram suitably determined by the system manager is registered in the retrieved data.
2. Contents suggesting clearing are registered in the appurtenant address X of the retrieval data.
3. The interrogation is entered as a clear instructing key input signal.
4. If the corresponding words are present to establish coincidence, the specific address in the memory is cleared according to the contents in the appurtenant address X.

It will be understood that the encoding signals carrying the specific address of the memory and the contents signifying clearing are stored in the appurtenant address X. In the case of a clearing operation, the contents of address X are not required to be displayed so that there is usually not employed a mechanism for producing an output outside of the machine. According to such arrangement, the encoded clear instruction can be suitably changed and reset at the interval of, for instance, one month, thus greatly securing memory protection.

Further, when adapting the present invention to such information retrieving apparatus, no specific translator circuit such as shown in FIG. 1 is required and the clear instructing cryptogram may be suitably registered in any vacant address in the apparatus, so that the entire mechanism can be simplified. Also, the clear address can be selected in various modes such as all clearing, classification selection clearing, etc., with ease.

We claim:
1. A memory clearing system comprising:
   a keyboard having a plurality of keys;
   a memory;
   logic means coupled to said keyboard and responsive only to the depression of preselected ones of said keys in a predetermined order for producing a corresponding output signal; and
   clear signal generating means coupled to said logic means and to said memory for generating a clear signal operative to clear the contents of said memory in response to said output signal.
2. A memory clearing system according to claim 1, wherein some of said keys correspond to respective alphabetic letters, each of said letters being printed on the surface of the corresponding key, and said predetermined combination of the keys corresponds to the word CLEAR.
3. A memory clearing system according to claim 1, wherein said clear signal generating means comprises a plurality of gates having first and second inputs, wherein said first inputs are coupled respectively to said particular keys, and a plurality of flip-flops arranged in sequence with said gates and having outputs coupled respectively to said second gate inputs, said flip-flops having inputs coupled respectively to outputs of said gates, wherein said clear signal is produced at the output of one of said gates when said respective keys are depressed in said predetermined order.
4. A memory clearing system comprising:
   at least one key switch means being actuable by linear movement;
   dial switch means being actuable by circular movement;
   a memory;
   logic means coupled to both of said switch means and responsive only to actuation of preselected ones of said switch means in a predetermined order for producing a corresponding output signal; and
   clear signal generating means coupled to said logic means and to said memory for generating a clear signal operative to clear the contents of said memory in response to said output signal.
5. A memory clearing system according to claim 4, wherein said dial switch means includes key and lock mechanism means for providing selective access to clear said memory.
6. A memory clearing system according to claim 4, wherein said key switch means comprises a CLEAR key switch.
7. A memory clearing system comprising:
   register means for selectively storing a CLEAR instruction cryptogram;
   means coupled to said register means for comparing information entered by keys with said stored CLEAR instruction cryptogram, and for producing a coincidence signal when the key-entered information coincides with said CLEAR instruction cryptogram;
   a memory; and
   clear signal generating means coupled to said comparing means and to said memory for generating a CLEAR signal operative to clear the contents of said memory in response to the coincidence signal from said comparing means.
8. A memory clearing system according to claim 7, wherein said cryptogram is selected from a group comprising natural words and sentences.

* * * * *

UNITED STATES PATENT OFFICE
CERTIFICATE OF CORRECTION

Patent No. 4,005,386    Dated January 25, 1977

Inventor(s) MITSUAKI SEKI, ET AL.

It is certified that error appears in the above-identified patent and that said Letters Patent are hereby corrected as shown below:

Column 5, line 13, change "DE2 and DE3" to --DE2' and DE3' --;

line 26, delete "the".

Column 6, line 68, change "if" (first occurrence) to --is--.

Column 7, line 3, insert --are-- before "at a";

line 32, change "tht" to --that--.

Column 8, line 1, after "pulse" insert --of--.

Signed and Sealed this

Twelfth Day of April 1977

[SEAL]

Attest:

RUTH C. MASON
*Attesting Officer*

C. MARSHALL DANN
*Commissioner of Patents and Trademarks*